United States Patent
Moon

(10) Patent No.: US 7,044,629 B2
(45) Date of Patent: May 16, 2006

(54) LAMP ASSEMBLY AND LIQUID CRYSTAL DISPLAY DEVICE HAVING THE SAME

(75) Inventor: Seung-Hwan Moon, Yongin-si (KR)

(73) Assignee: Samsung Electronics Co., Ltd., (KR)

( * ) Notice: Subject to any disclaimer, the term of this patent is extended or adjusted under 35 U.S.C. 154(b) by 132 days.

(21) Appl. No.: 10/456,909

(22) Filed: Jun. 5, 2003

(65) Prior Publication Data

US 2004/0080925 A1    Apr. 29, 2004

(30) Foreign Application Priority Data

Oct. 25, 2002    (KR) ............ 10-2002-0065550

(51) Int. Cl.
*F21V 8/00* (2006.01)
(52) U.S. Cl. ............... 362/634; 362/218; 362/613
(58) Field of Classification Search .......... 362/26, 362/27, 29, 31, 225, 294, 373, 561, 241, 362/218, 613, 614, 633, 634; 349/65, 58
See application file for complete search history.

(56) References Cited

U.S. PATENT DOCUMENTS

| | | | | |
|---|---|---|---|---|
| 5,504,605 A | * | 4/1996 | Sakuma et al. | 349/58 |
| 5,677,746 A | * | 10/1997 | Yano | 349/65 |
| 6,295,105 B1 | * | 9/2001 | Lee et al. | 362/31 |
| 6,565,234 B1 | * | 5/2003 | Skegin et al. | 362/294 |
| 6,871,979 B1 | * | 3/2005 | Mai | 362/241 |

* cited by examiner

*Primary Examiner*—Y. My Quach-Lee
(74) *Attorney, Agent, or Firm*—Cantor Colburn LLP

(57) ABSTRACT

A lamp assembly includes at least one lamp for generating light, a reflecting layer, and a conductive supporting member. The reflective layer reflects a part of the light traveling in a first direction toward a second direction opposite to the first direction. The conductive supporting member includes a supporting sheet for supporting the reflecting layer and a plurality of penetrating holes formed in the supporting sheet. The penetrating holes reduce the overlapping area between the lamp and the supporting sheet. The reflective layer and the conductive supporting member are disposed on a rear side of the lamp.

25 Claims, 15 Drawing Sheets

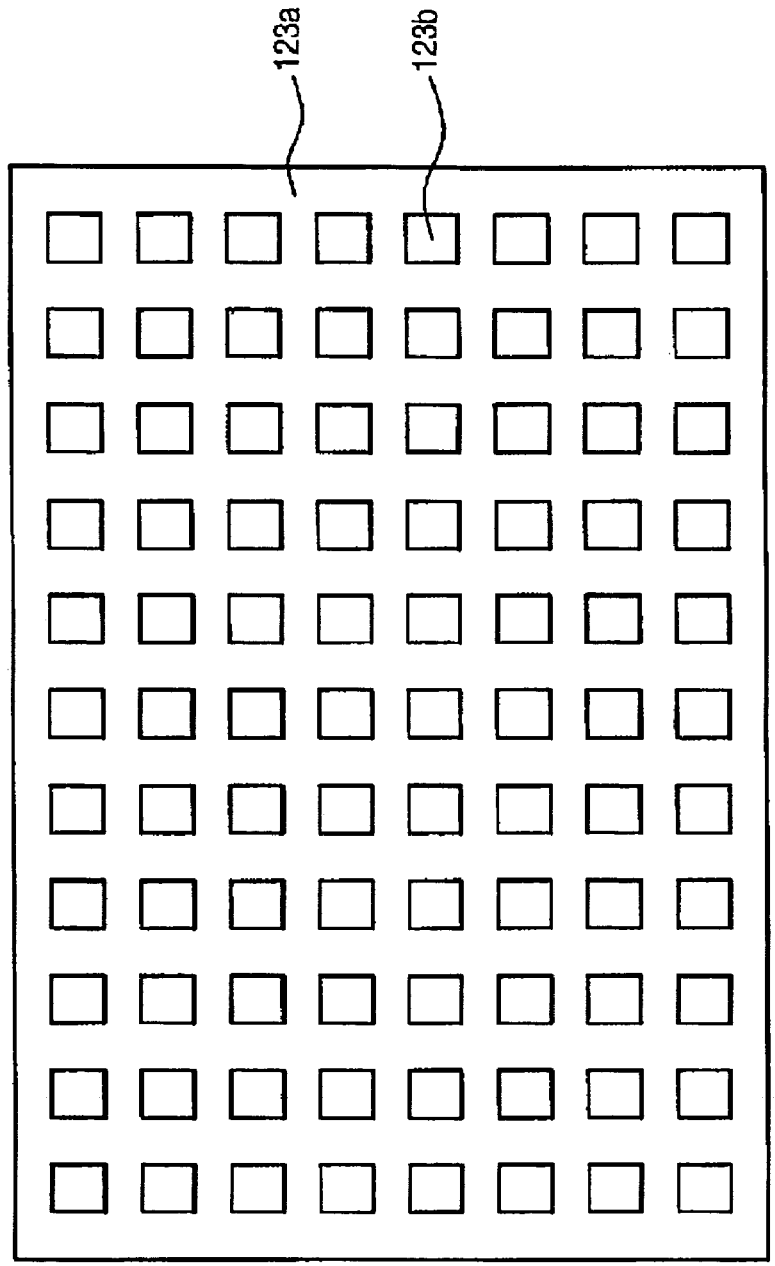

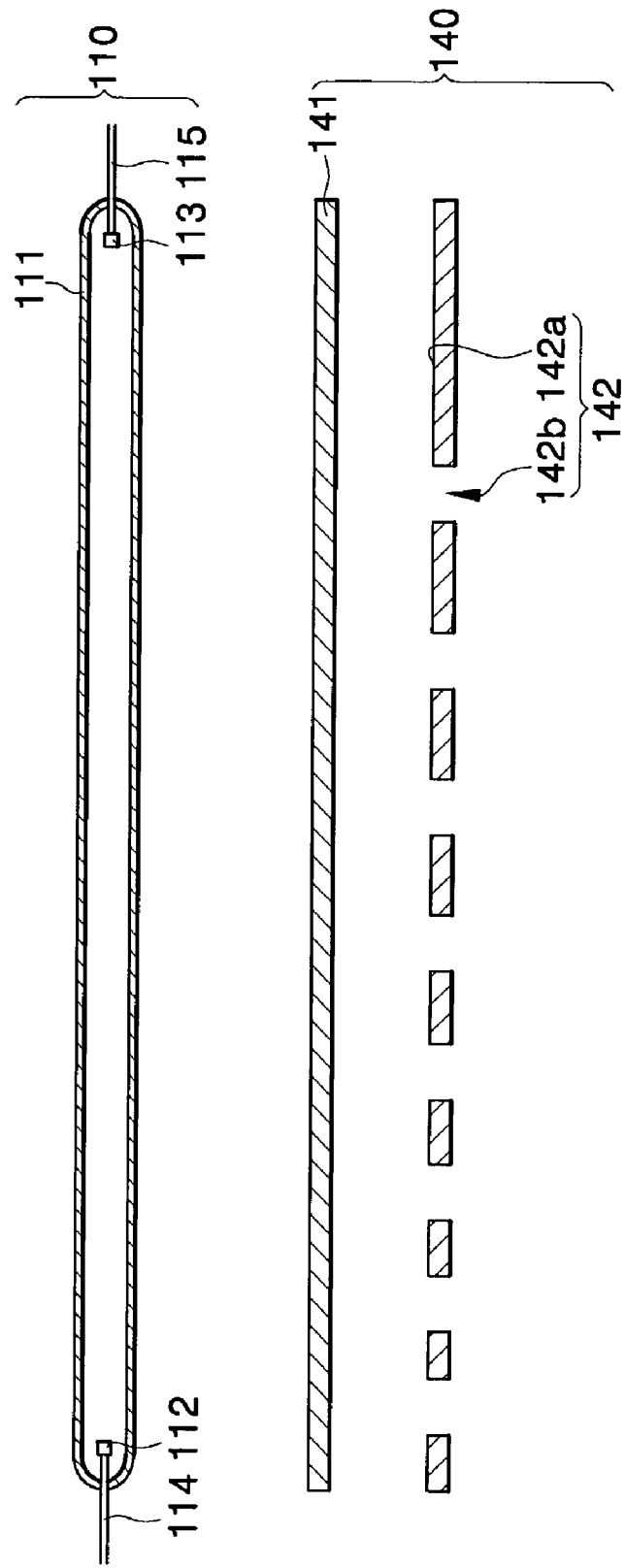

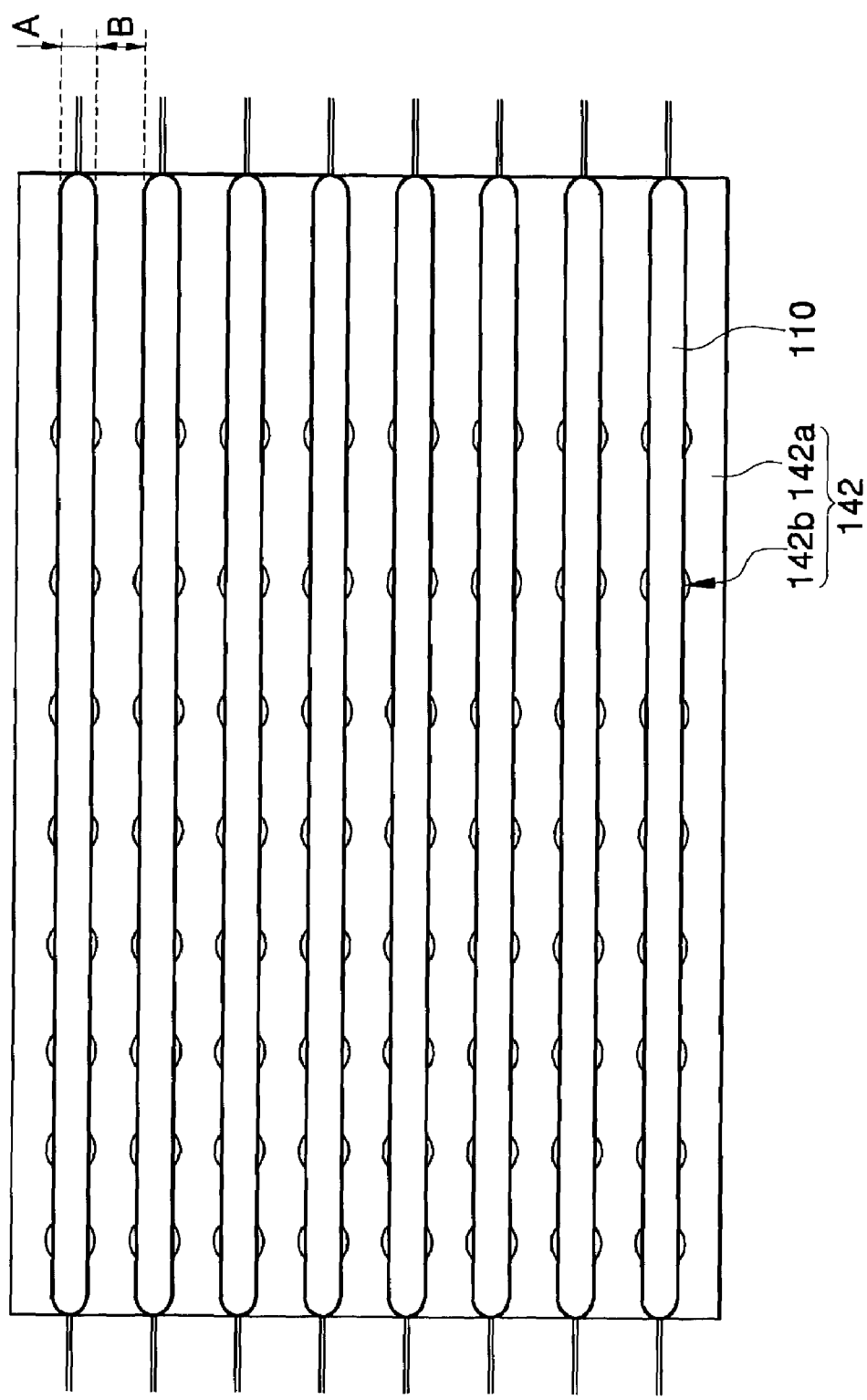

LAMP ASSEMBLY AND LIQUID CRYSTAL DISPLAY DEVICE HAVING THE SAME

BACKGROUND OF THE INVENTION

1. Field of the Invention

The disclosure relates to a lamp assembly and a liquid crystal display device having the same, and more particularly to a lamp assembly for enhancing light efficiency as well as display quality and a liquid crystal display device having the lamp assembly.

2. Description of the Related Art

In general, an information processing device is associated with an interfacing device, such as a display device, for displaying information processed by the information processing device so that users may view images displayed on the display device in accordance with the processed information. Recently, a liquid crystal display (LCD) device is widely used as a display device.

The LCD device displays information by using the optical property of liquid crystal molecules which varies in response to a change in their alignment. In more detail, when electric field is applied to liquid crystal disposed between two transparent substrates, an alignment of the liquid crystal molecules is transformed into other molecular alignment. As a result, the optical property, such as double refractivity, dichroism and light scattering of a liquid crystal cell, is changed, and information can be displayed on an LCD panel by using the change of the optical property of the liquid crystal molecules.

The LCD panel comprises a thin film transistor (TFT) substrate, a color filter substrate opposite to the TFT substrate, and the liquid crystal disposed between the TFT substrate and the color filter substrate. The liquid crystal cannot emit light by itself, but can control transmittance of light incident thereonto. Therefore, the LCD devices using such liquid crystal require light to display images. The light is usually supplied from a separate light source such as a backlight assembly. Consequently, display quality and power consumption of an LCD device having the liquid crystal is mainly influenced by the backlight assembly.

FIG. 1 is a cross sectional view showing a conventional backlight assembly for an LCD device.

Referring to FIG. 1, the conventional backlight assembly 30 includes at least one lamp 10 and lamp reflector 20. The lamp 10 includes a light emitting portion 11, a first electrode 12 and a second electrode 13 formed at both ends of the light emitting portion 11, respectively, and a first electrical wire 14 and a second electrical wire 15 connected to the first and second electrodes 12 and 13, respectively. A first voltage, relatively high voltage, is applied to the first electrode 12 through the first electrical wire 14. A second voltage, relatively low voltage, is applied to the second electrode 13 through the second electrical wire 15. As a result, the lamp 10 radiates light through the light emitting portion 11.

The lamp reflector 20 includes a reflecting layer 21 for reflecting a part of the light proceeding in a first direction to a second direction opposite to the first direction, and a supporting member 22 for supporting the reflecting layer 21 and the lamp 10. Therefore, the lamp reflector 20 improves light efficiency of the lamp 10.

Generally, the reflecting layer 21 is made of polyethylene terephthalate (PET), and the supporting member 22 is made of metal such as aluminum (Al).

However, when the reflecting layer 21 is contacted on an entire surface of the supporting member 22, the heat generated from the lamp 10 due to the current applied to the lamp 10, is transmitted through the reflecting layer 21 to the supporting member 22. Accordingly, luminance saturation time increases due to the heat loss. It takes longer than usual to acquire the maximum luminance of the LCD device.

In addition, a leakage current is generated due to a parasitic capacitance between the supporting member 22 and the lamp 10.

$$C = \varepsilon \frac{A}{d} \qquad \text{<Expression 1>}$$

As shown in Expression 1, the capacitance 'C' is generally proportional to an overlapped area 'A' between two conductors and a dielectric ratio '∈' of the dielectric substance between the two conductors, and inversely proportional to a distance 'd' between the two conductors. Therefore, the parasitic capacitance 'C' is proportional to a surface area 'A' of the supporting member 22 overlapped with the lamp 10, and inversely proportional to a distance 'd' between the lamp 10 and the supporting member 22.

According to a recent LCD technology, the distance between the lamp 10 and the lamp reflector 20 has a tendency to decrease for slimness of the LCD device. The parasitic capacitance between the lamp 10 and the supporting member 22 increases since the distance 'd' between the lamp 10 and the supporting member 22 decreases. Therefore, an amount of the leakage current also increases according as the parasitic capacitance increases.

A current supplied to the first electrode 12 is referred as a first current, a current exiting from the second electrode 13 is referred as a second current, and a leakage current leaked from the lamp 10 is referred as, a third current. An amount of the first current is equal to the sum of the second current and the third current. The larger the amount of the third current is, the smaller the amount of the second current is. Use efficiency of the first current may be reduced due to existence of the third current. The leakage current reduces not only the efficiency of the lamp 10 but also overall luminance of the LCD device.

Furthermore, an increase of the leakage current causes an increase of the heat generated from the lamp 10. The heat also deteriorates the liquid crystal and various sheets adjacent to the lamp 10, which also lowers display quality of the LCD device.

SUMMARY OF THE INVENTION

The present invention provides a lamp assembly for improving display quality as well as light efficiency thereof.

The present invention also provides a liquid crystal display device having the lamp assembly.

In an aspect of the present invention, there is provided a lamp assembly comprising: at least one lamp for generating light; a reflecting layer disposed on one side of the lamp, for reflecting a part of the light; and a conductive supporting member including a supporting sheet for supporting the reflecting layer and a plurality of penetrating holes formed in the supporting sheet.

In anther aspect of the present invention, there is provided a lamp assembly comprising: at least one lamp for generating light; a reflecting layer disposed on one side of the lamp, for reflecting a part of the light; and a conductive supporting member including a supporting sheet for supporting the reflecting layer and a plurality of grooves formed in the supporting sheet.

In another aspect of the present invention, there is provided a liquid crystal display device comprising: a backlight assembly including at least one lamp for generating light, a reflecting layer for reflecting a part of the light and being disposed on one side of the lamp, and a conductive supporting member having a supporting sheet for supporting the reflecting layer and a plurality of penetrating holes formed in the supporting sheet; a liquid crystal display panel for displaying images by using liquid crystal onto which the light is incident; a first container for receiving the backlight assembly and the liquid crystal display panel; and a second container oppositely coupled with the first container, for fixing the backlight assembly and the liquid crystal display panel into the first container.

In anther aspect of the present invention, there is provided a liquid crystal display device comprising: a backlight assembly including at least one lamp for generating light, and a reflecting layer for reflecting a part of the light and being disposed on one side of the lamp; a liquid crystal display panel for displaying images by using liquid crystal onto which the light is incident; and a conductive receiving container for receiving the backlight assembly and the liquid crystal display panel, the conductive receiving container including a bottom surface for supporting the reflecting layer and a plurality of openings formed in the bottom surface.

The supporting member may be disposed on the rear side of at least one lamp for generating light. The supporting member may include a supporting sheet for supporting a reflecting layer and a plurality of penetrating holes formed on the supporting sheet along the longitudinal direction of the lamp so as to reduce the overlapping area between the supporting sheet and the lamp.

Accordingly, the leakage current leaked from the lamp can be decreased, the light efficiency of the backlight assembly can be improved, the heat radiated from the lamp can also be reduced, and the display quality of the LCD device can be enhanced.

BRIEF DESCRIPTION OF THE DRAWINGS

The above and other objects and advantages of the present invention will become readily apparent by reference to the following detailed description when considered in conjunction with the accompanying drawings, in which:

FIG. 5A is a plan view showing the supporting member of FIG. 3 according to another exemplary embodiment of the present invention;

FIG. 6 is a cross sectional view showing a backlight assembly according to a second exemplary embodiment of the present invention;

FIG. 7 is a plan view shown the backlight assembly of FIG. 6;

DETAILED DESCRIPTION OF THE INVENTION

The present invention now will be described more fully hereinafter with reference to the accompanying drawings, in which preferred exemplary embodiments of the invention are shown. This invention may, however, be embodied in many different forms and should not be construed as limited to the embodiments set forth herein.

Figure 1:
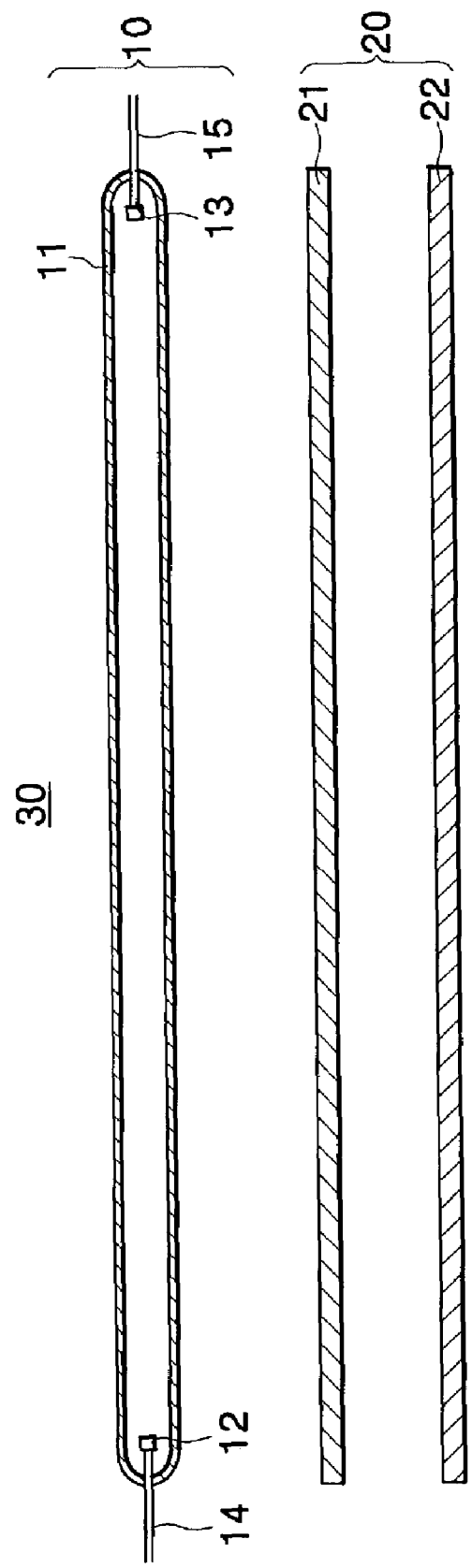
FIG. 1 is a cross sectional view showing a conventional backlight assembly of an LCD device.
Figure 2:
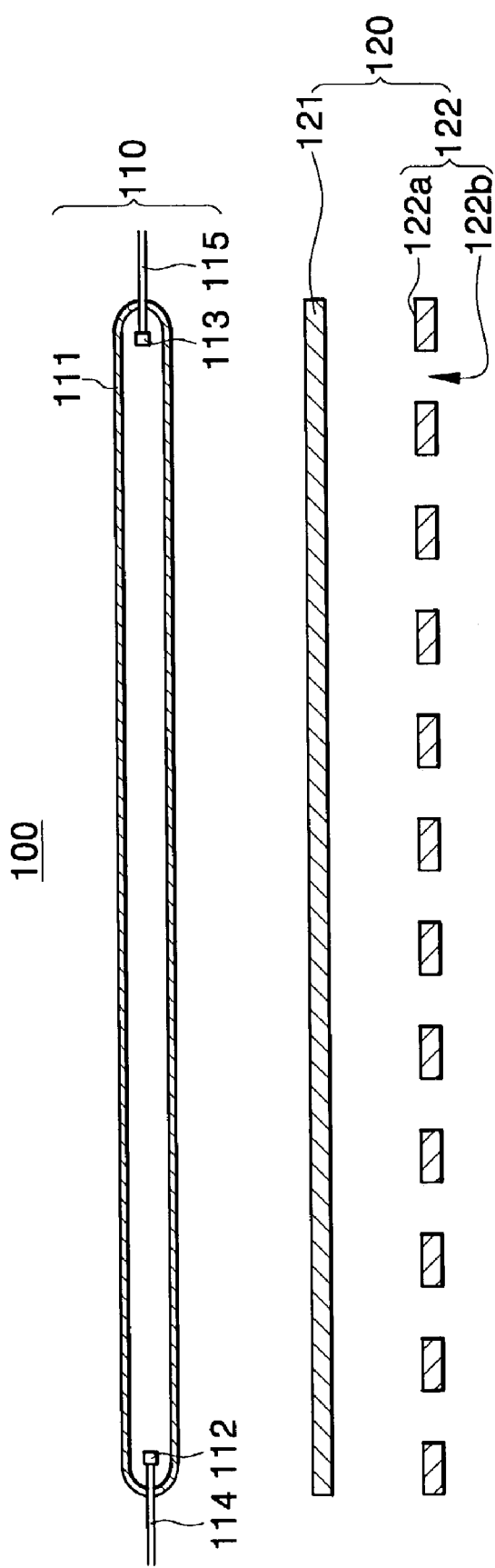
FIG. 2 is a cross sectional view showing a backlight assembly according to a first exemplary embodiment of the present invention.
Figure 3:
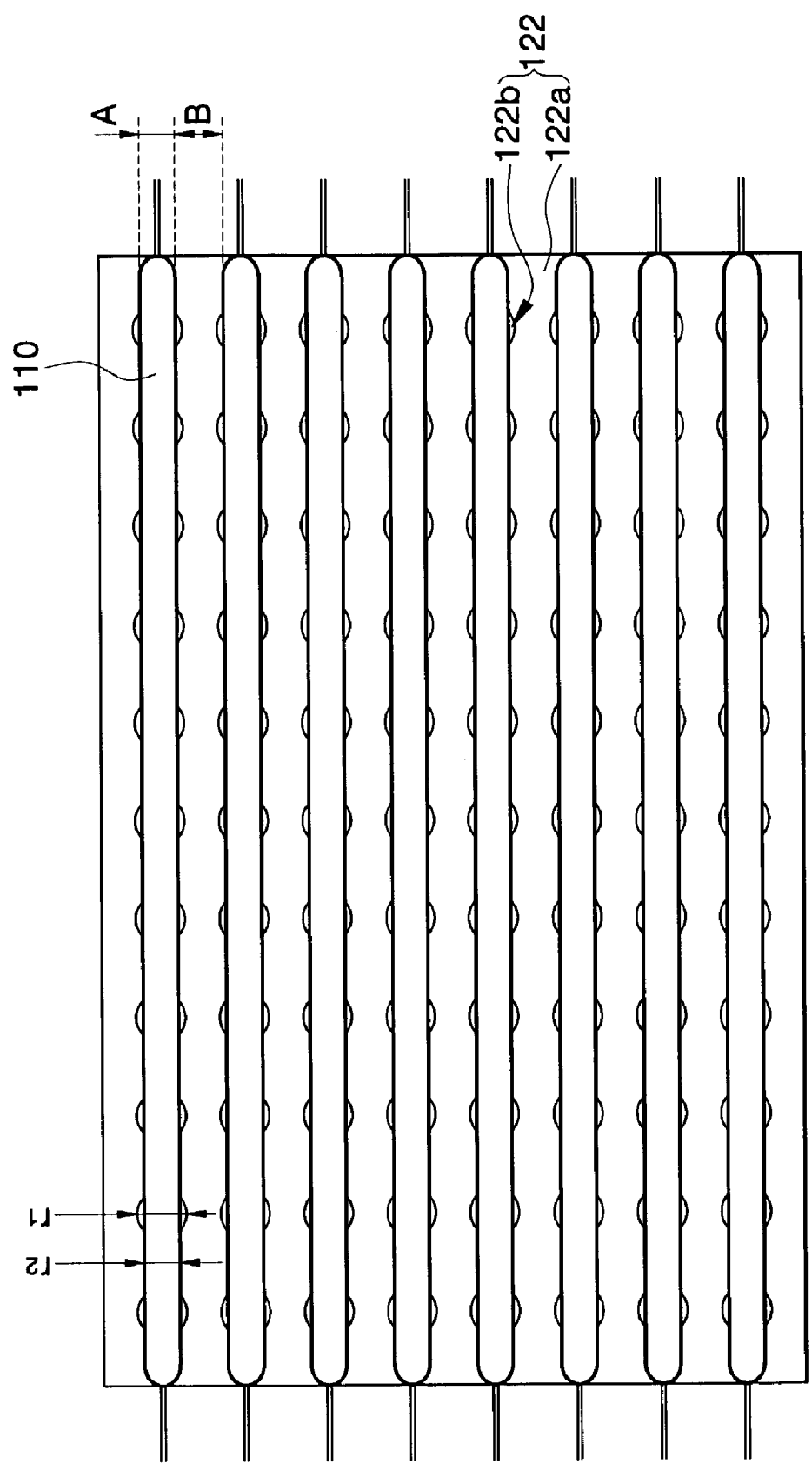
FIG. 3 is a plan view showing the backlight assembly of FIG. 2.

FIG. 2 is a cross sectional view showing a backlight assembly according to a first exemplary embodiment of the present invention, and FIG. 3 is a plan view showing the backlight assembly of FIG. 2. In FIG. 3, a reflecting layer disposed between lamps 110 and a supporting member 122 is not shown for a better view of the structure.

Referring to FIG. 2 and FIG. 3, a backlight assembly 100 according to a preferred exemplary embodiment of the present invention includes at least one lamp 110 for generating light and a lamp reflector 120 for reflecting the light from the lamps 110 to a predetermined direction. The lamp reflector 120 includes a reflecting layer 121 and a supporting member 122 for supporting the reflecting layer 121.

The reflecting layer 121 reflects the light that is generated from the lamp 110 and is incident onto the reflecting layer 121 to a predetermined direction. The supporting member 122 includes a supporting sheet 122a for supporting the reflecting layer 121 and a plurality of penetrating holes 122b for reducing an overlapping area between the supporting sheet 122a and the lamps 110. Here, the "overlapping area" indicates an area of the supporting sheet 122a above which the lamps 110 are placed. The penetrating holes 122b are formed in the supporting sheet 122a and arranged in the longitudinal direction of the lamp 110.

For example, the reflective layer 121 is made of poly ethylene terephthalate (PET), and the supporting member 122 is made of metal substance, such as aluminum (Al). Also, the supporting member 122 may be coated with the reflective layer 121 in the form of a thin film. The supporting member 122 may further include an adhesive on the supporting sheet 122a to facilitate the coating of the reflective layer 121 on the supporting sheet 122a.

The adhesive (e.g., an adhesive tape) is adhered to the surface of the supporting sheet 122a and helps the reflecting layer 121 be coated on the supporting member 122 independent of the plurality of penetrating hole 122b. The adhesive may be made of insulating material so that a parasitic capacitance may be prevented from being formed between the adhesive tape and the lamp 110.

The lamp 110 includes a light emitting portion 111, a first electrode 112 that is formed at a first end of the light emitting portion 111 and receives a first voltage, a second electrode 113 that is formed at a second end of the light emitting portion 111 opposite to the first end and receives a second voltage lower than the first voltage, a first electrical wire 114 for transmitting the first voltage to the first electrode 112, and a second electrical wire 115 for transmitting the second voltage to the second electrode 113. The first and second voltages are supplied from an inverter (not shown), which can convert a DC (direct current) power, which is supplied from an exterior power source so as to drive the lamp, into an AC (alternative current) power.

As shown in FIG. 3, the supporting member 122 is divided into a first region 'A' on which a plurality of the lamps 110 are disposed and a second region 'B' that is between the lamps 110. The plurality of penetrating holes 122b is formed on the first region 'A' to reduce the overlapping area of the supporting sheet 122a. For example, the plurality of penetrating holes 122b are formed in the supporting sheet 122a with a uniform density. In other words, the penetrating holes 122b may be formed uniformly in the entire area of the supporting sheet 122a.

When the entire area of the supporting sheet 122a is referred as a first area a1 when the plurality of penetrating holes 122b are not formed thereon, the entire surface area of the supporting sheet 122a is referred as a second area a2 when the plurality of penetrating holes 122b are formed thereon, and the total area of the plurality of penetrating holes 122b is referred as a third area a3, the second area a2 is equal to the difference between the first area a1 and the third area a3, which indicates that the overlapping area between the lamps 110 and the supporting sheet 122a is reduced by the third area a3.

A parasitic capacitance 'C' exists between the lamps 110 and the supporting member 122 between which air and the reflecting layer 121 are disposed. The parasitic capacitance 'C' is determined according to the above Expression 1.

The parasitic capacitance 'C' is proportional to a dielectric constant '∈' of dielectric material between the lamps 110 and the supporting member 122, and to the surface area of the supporting sheet 122b facing the lamps 110. The parasitic capacitance 'C' is inversely proportional to the distance between the lamps 110 and the supporting member 122.

It is not desirable for slimness of an LCD device that the distance 'd' between the lamps 110 and the supporting member 122 be increased. Therefore, the parasitic capacitance 'C' may be decreased by reducing the overlapping area between the lamps 110 and the supporting member 122. The plurality of penetrating holes 122b formed in the supporting sheet 122a reduce the overlapping area between the lamps 110 and the supporting sheet 122a by the area of the penetrating holes 122b, so that the parasitic capacitance 'C' is reduced.

Accordingly, the leakage current leaked from the first and second electrodes (112, 113) of the lamp 110 is also reduced because the parasitic capacitance 'C' is reduced.

In the exemplary embodiment of FIG. 2, the current flowed into the first electrode 112 is referred as a first current, the current flowed out of the second electrode 113 is referred as a second current, and the leakage current leaked from the lamp 110 is referred as a third current. Then, the third current is equal to the difference between the first current and the second current. According to the present embodiment of the present invention, since the parasitic capacitance 'C' is reduced owing to the plurality of penetrating holes 122b, the difference between the first current and the second current decreases. As a result, the third current is reduced. Therefore, the light efficiency of the lamp 110 can be improved.

Referring to FIG. 3, the diameter r1 of a penetrating hole 122b is equal to or larger than the width r2 of a lamp 110. Thus, the overlapping area between the lamps 110 and the supporting sheet 122a is reduced. Furthermore, the overlapping area between the lamp 110 and the supporting sheet 122a is still reduced even though the center of each lamp 110 and the corresponding penetrating holes 122b are not exactly aligned, because the diameter r1 of the penetrating hole 122b is larger than the diameter r2 of the lamp 110.

In case of the penetrating holes 122b each having a circular shape as shown in FIG. 3, the diameter r1 of the penetrating hole 122b is compared with the diameter r2 of the lamp 110. In case that the penetrating hole 122b has a rectangular or square shape in another embodiment, a width of the penetrating hole is equal to or larger than the diameter r2 of the lamp 110. The width of the penetrating hole is defined as a distance between two sides facing each other of the penetrating hole having a rectangular or square shape.

Although the above exemplary embodiments discuss a backlight assembly embodied in a direct illuminating type backlight assembly for LCD devices, the backlight assembly could also be applied to other display devices and illuminating devices, such as a fluorescent lamp, known to one of the ordinary skill in the art.

Figure 4:
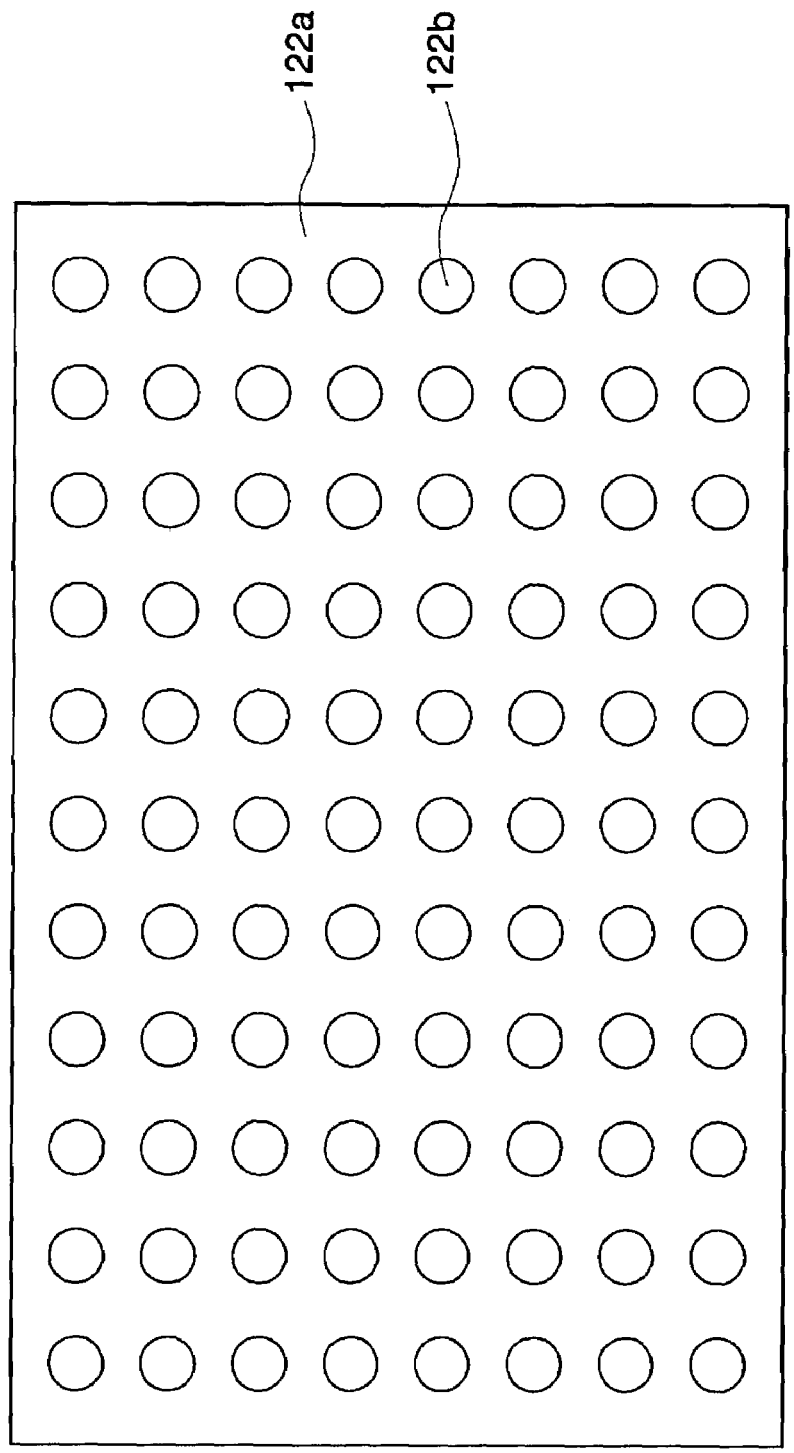
FIG. 4 is a plan view showing a supporting member of FIG. 3.

FIG. 4 is a plan view showing the supporting member 122 as shown in FIG. 3, and FIG. 5 is a plan view showing the supporting member according to another exemplary embodiment of the present invention.

Figure 5B:
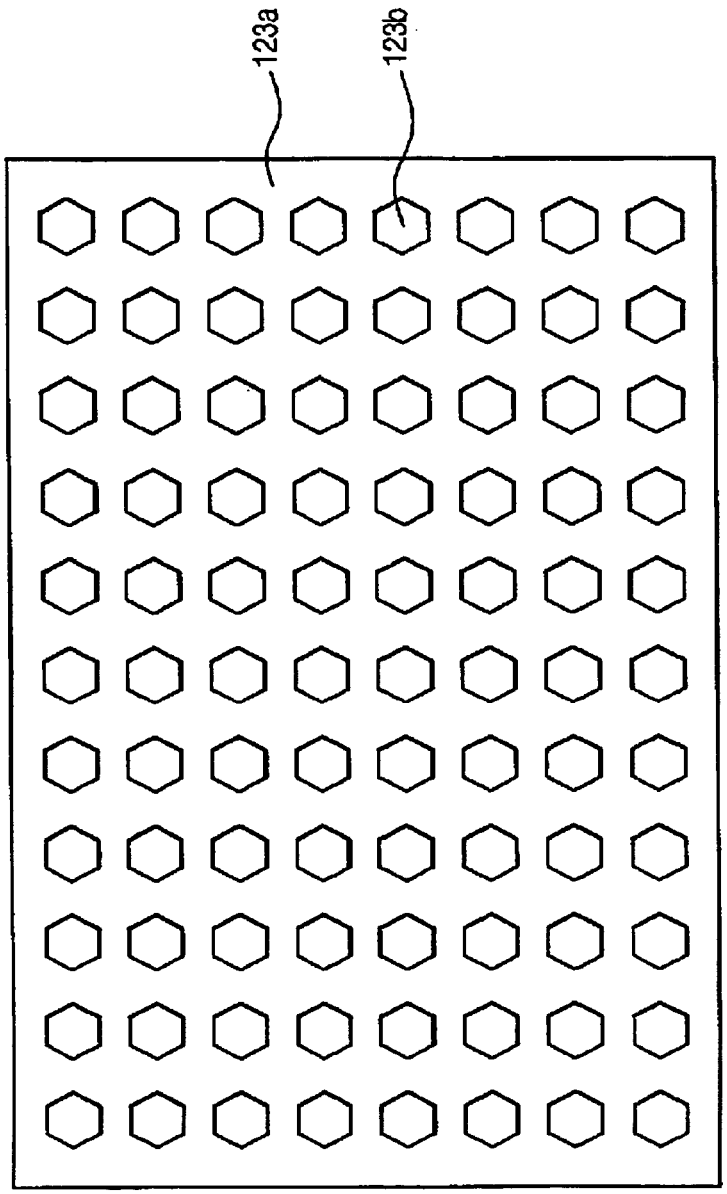
FIG. 5B is a plan view showing the supporting member of FIG. 3 including penetrating holes having a polygonal shape according to another exemplary embodiment of the present invention.

Referring to FIG. 4 and FIGS. 5A and 5B, the plurality of penetrating holes (122b, 123b) each have a circular or rectangular shape. Although the above embodiments have been described as including penetrating holes having a circular or rectangular shape, other shapes, such as a polygonal shape (referring to FIG. 5B), of the penetrating holes may be utilized in conjunction with or in place of the circular or rectangular shape of the penetrating holes. In addition, the penetrating holes each may have an elliptical shape, a trapezoid shape, or the like.

Furthermore, although a penetrating hole (122b or 123b) corresponds to only one lamp in the embodiment shown in FIG. 3, a penetrating hole may correspond to two or more lamps in other embodiments (not shown).

FIG. 6 is a cross sectional view showing a backlight assembly according to a second exemplary embodiment of the present invention, and FIG. 7 is a plan view shown the backlight assembly as shown in FIG. 6. In FIG. 7, a reflecting layer 141 (referring to FIG. 6) disposed between lamps 110 and a supporting member 142 is not shown for a better view of the structure.

Referring to FIG. 6 and FIG. 7, a backlight assembly 130 according to second exemplary embodiment of the present invention includes at least one lamp 110 for generating light and a lamp reflector 140 for reflecting the light from the lamp 110 to a predetermined direction. The lamp reflector 140 includes a reflecting layer 141 and a supporting member 142 for supporting the reflecting layer 141.

The reflecting layer 141 reflects the light that is generated from the lamp 110 and incident onto the reflecting layer 141 in a predetermined direction. The supporting member 142 includes a supporting sheet 142a for supporting the reflecting layer 141 and a plurality of penetrating holes 142b for reducing overlapping area between the supporting sheet 142a and the lamp 110. The penetrating holes 142b are formed in the supporting sheet 142a and arranged in the longitudinal direction of the lamp 110.

The lamp 110 includes a light emitting portion 111, a first electrode 112 that is formed at a first end of the light emitting portion 111 and receives a first voltage, a second electrode 113 that is formed at a second end of the light emitting portion 111 opposite to the first end and receives a second voltage lower than the first voltage, a first electrical wire 114 for transmitting the first voltage to the first electrode 112, and a second electrical wire 115 for transmitting the second voltage to the second electrode 113.

As shown in FIG. 7, the supporting member 142 is divided into a first region 'A' in which the plurality of the lamps 110 are disposed, and a second region 'B' between the lamps 110. The plurality of penetrating holes 142b are formed along the first region 'A'. The penetrating holes 142b reduce the overlapping area between the supporting member 142 and the lamps 110.

In this embodiment, the plurality of penetrating holes 142b are formed in the supporting sheet 142a along the first region 'A' in such a manner that a decrease in the overlapping area between the lamps 110 and the supporting sheet 142a varies in proportion to a distance between a penetrating hole and the second electrode. In other words, a density of the penetrating holes 142b is higher at an area close to the first electrode 112 than at an area close to the second electrode 113. Since a relatively high voltage is applied to the first electrode 112 and a relatively low voltage is applied to the second electrode 113, more amount of current is leaked from the first electrode 112 than from the second electrode 113. Thus, the plurality of penetrating holes 142b are formed in such a manner that there are more penetrating holes 142b around the first electrode 112 than around the second electrode 113. Accordingly, the parasitic capacitance 'C' around the first electrode 112 is reduced to thereby decrease the leakage current leaked from the lamps 110.

Figure 8:
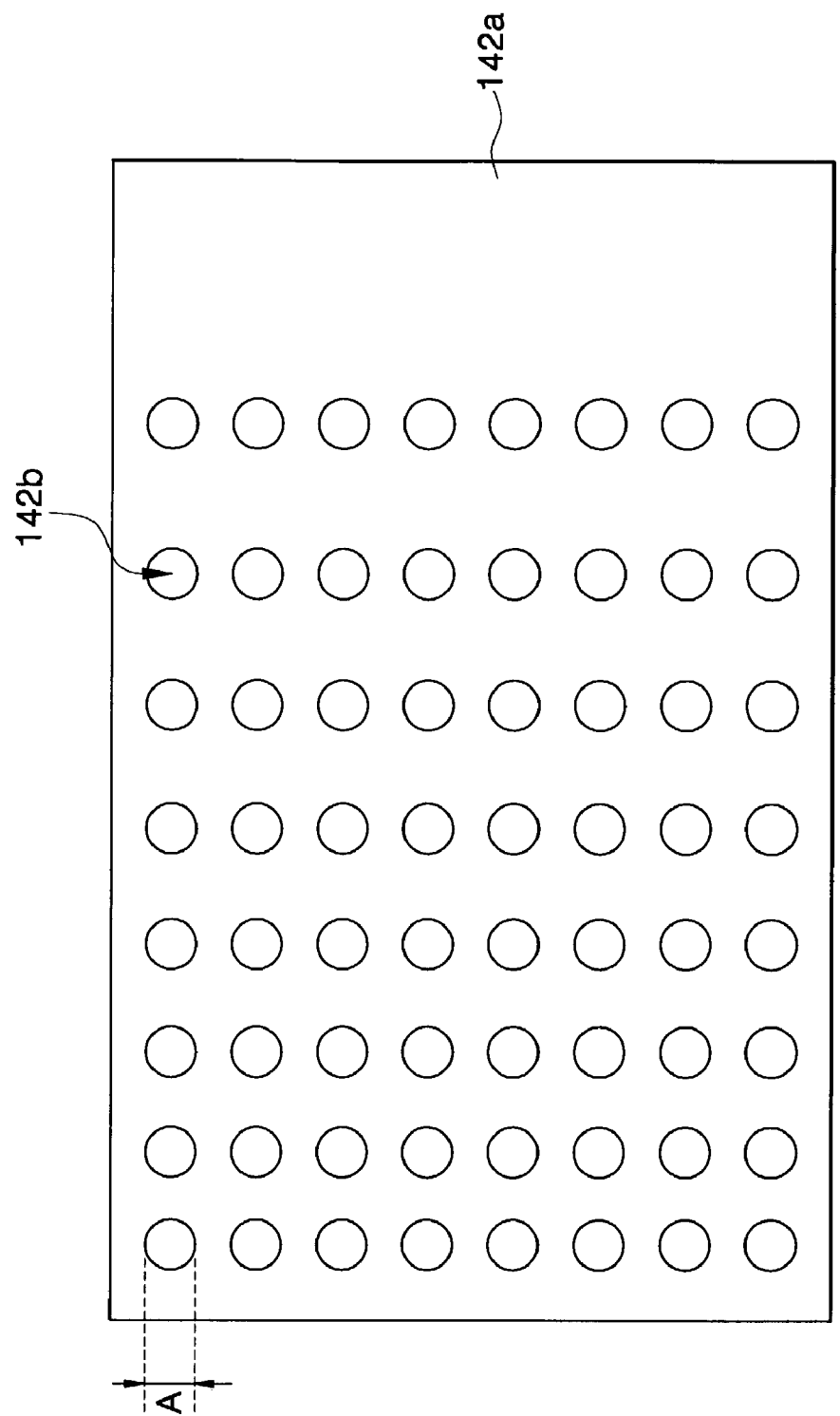
FIG. 8 is a plan view showing a supporting member of FIG. 7.
Figure 9:
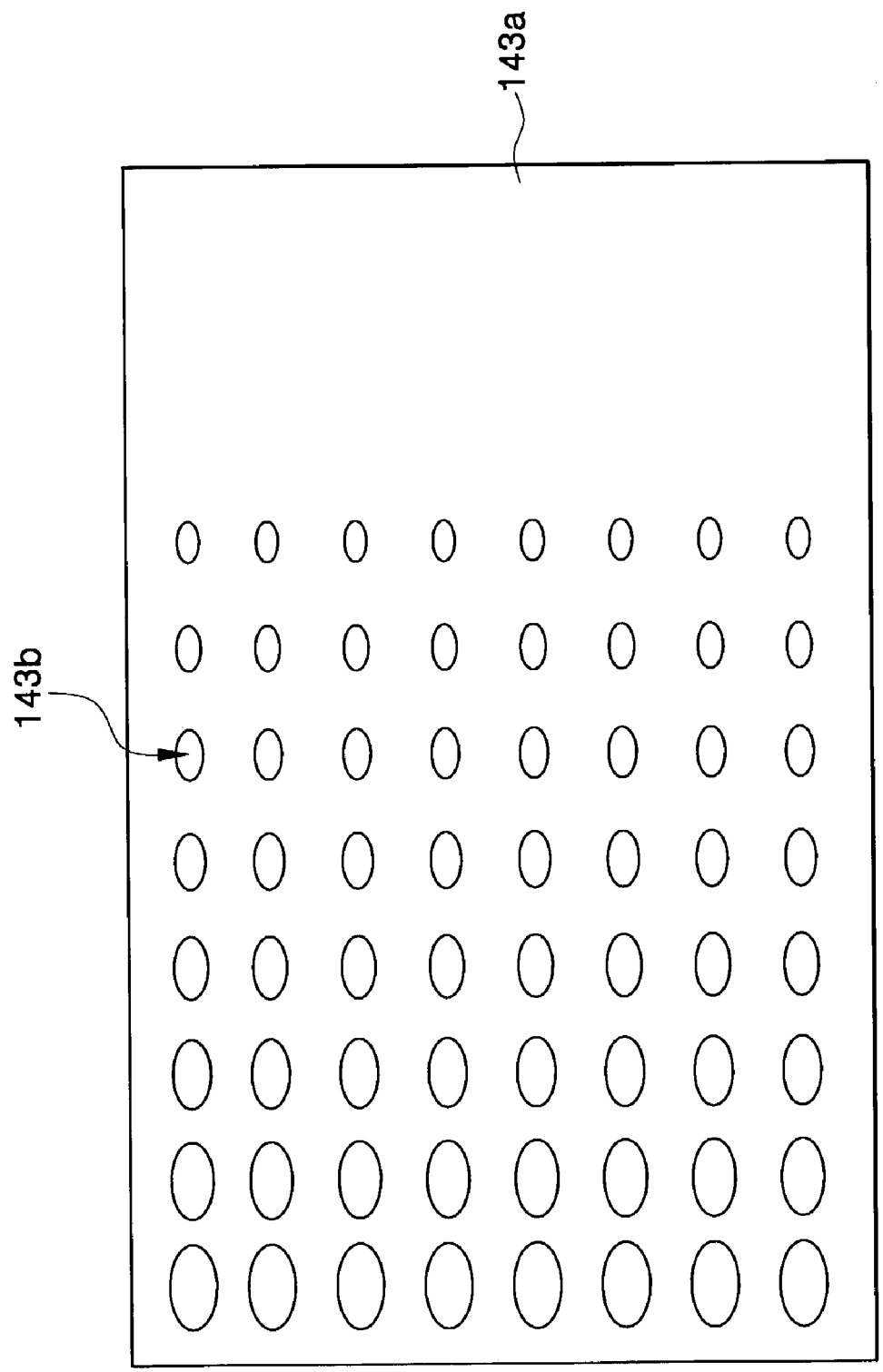
FIG. 9 is a plan view showing the supporting member of FIG. 7 according to another exemplary embodiment of the present invention.

FIG. 8 is a plan view showing the supporting member of FIG. 7, and FIG. 9 is a plan view showing the supporting member according to another exemplary embodiment of the present invention.

Referring to FIG. 8, the plurality of penetrating holes 142b are formed at the supporting sheet 142a in the first region 'A' in such a manner that a density of the plurality of penetrating holes 142b gradually increases in proportion to a distance between a penetrating hole and the second electrode 113. In the embodiment shown in FIG. 9, the penetrating holes 143b are formed at the supporting sheet 143a in the first region 'A' in such a manner that the size of the plurality of penetrating holes 143b gradually increases in proportion to a distance between a penetrating hole and the second electrode 113. Therefore, a decrease in the overlapping area between the supporting sheet 143a and the lamps 110 gradually varies in proportion to a distance between a penetrating hole and the second electrode 113.

The supporting member (142 or 143) can be variously modified to reduce the overlapping area between the lamps 110 and the supporting sheet (142a or 143a).

Figure 10:
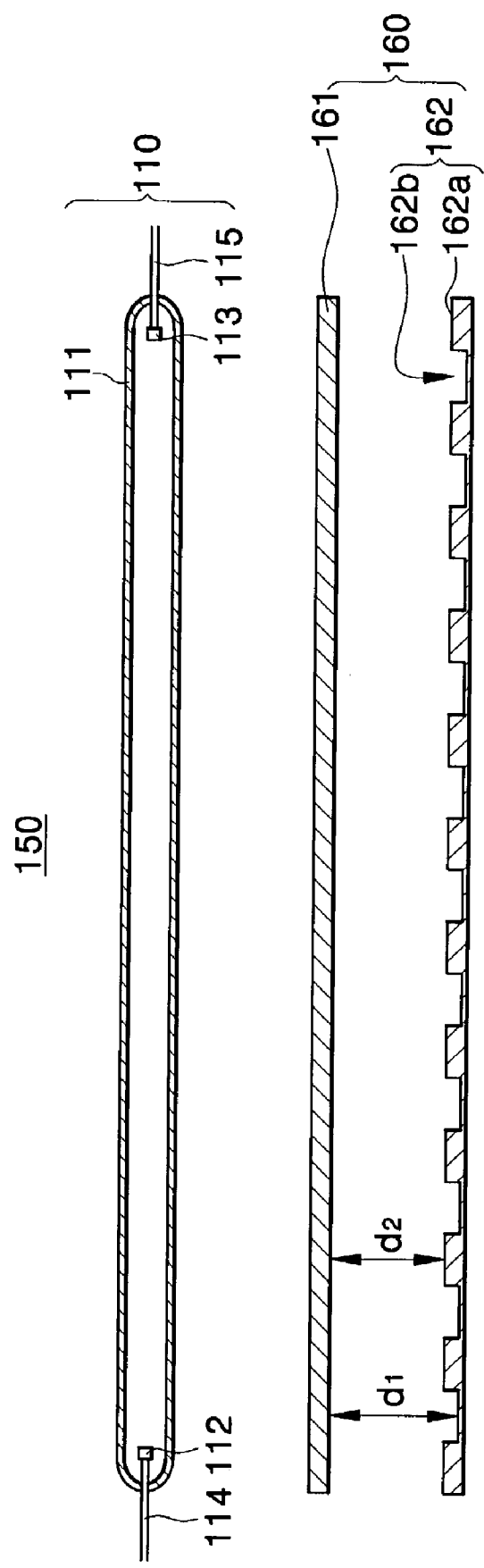
FIG. 10 is a cross sectional view showing a backlight assembly according to a third exemplary embodiment of the present invention.
Figure 11:
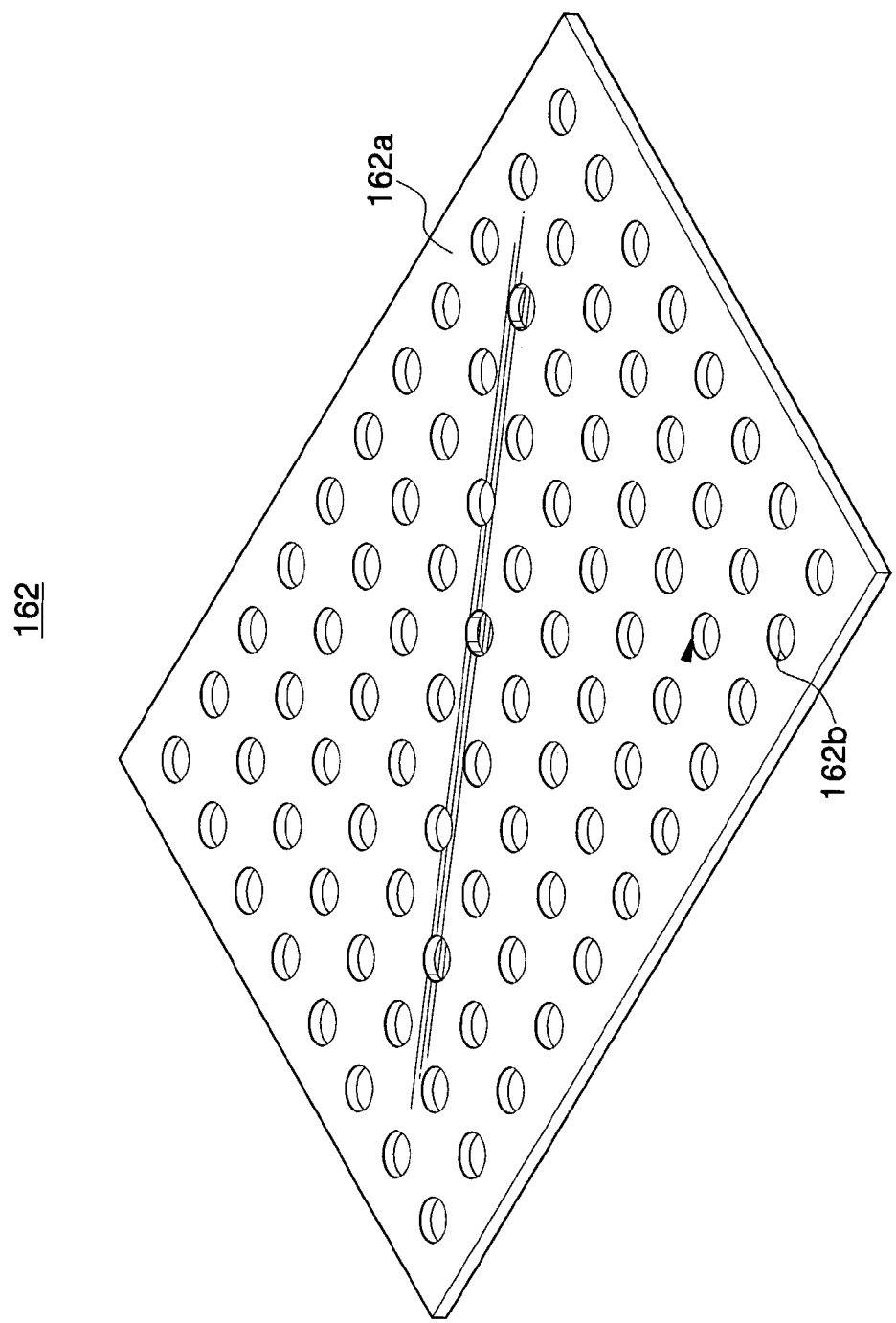
FIG. 11 is a perspective view shown a supporting member of FIG. 10.

FIG. 10 is a cross sectional view showing a backlight assembly according to a third exemplary embodiment of the present invention, and FIG. 11 is a perspective view showing a supporting member of FIG. 10.

Referring to FIG. 10 and FIG. 11, a backlight assembly 150 according to a third exemplary embodiment of the present invention includes at least one lamp 110 for generating light and a lamp reflector 160 for reflecting the light from the lamp 110 in a predetermined direction. The lamp reflector 160 includes a reflecting layer 161 and a supporting member 162 for supporting the reflecting layer 161.

The reflecting layer 161 reflects the light that is generated from the lamp 110 and incident onto the reflecting layer 161 in a predetermined direction. The supporting member 162 includes a supporting sheet 162a for supporting the reflecting layer 161 and a plurality of grooves 162b that are formed in the supporting sheet 162a and arranged in the longitudinal direction of the lamp 110 so as to reduce an overlapping area between the supporting sheet 162a and the lamp 110.

The grooves 162b are formed in a region corresponding to the lamp 110 with a predetermined depth measured from the surface of the supporting sheet 162a and may be elongated in the longitudinal direction of the lamp 110. The distance between the lamp 110 and the supporting member 162 is longer in the grooved area than in the non-grooved area as much as the depth of the groove.

For example, the interval between the lamp 110 and the bottom of the groove 162b is referred as a first distance d1, and the interval between the lamp 110 and the surface of the non-grooved area of the supporting sheet 162a is referred as a second distance d2, and the second distance d2 is smaller than the first distance d1 by the depth of the groove 162b.

According to the above Expression 1, the parasitic capacitance 'C' is inversely proportional to a distance between the lamp 110 and the supporting sheet 162a. The distance between the lamp 110 and the supporting sheet 162a increases as much as the depth of the groove 162 so that the parasitic capacitance 'C' is reduced and the leakage current leakage from the lamp 110 decreases.

Figure 12:
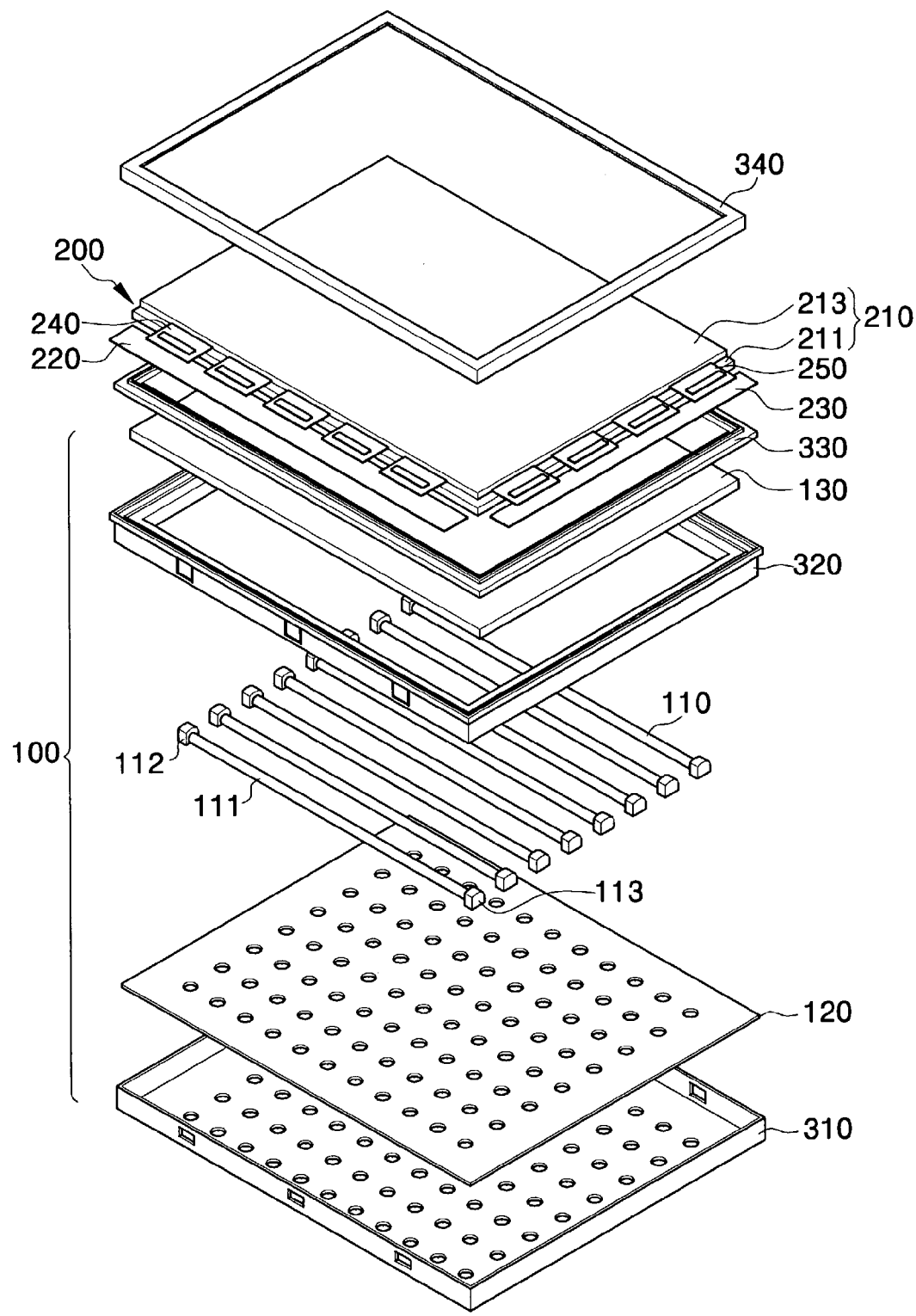
FIG. 12 is an exploded perspective view showing a liquid crystal display device according to a fourth exemplary embodiment of the present invention.
Figure 13:
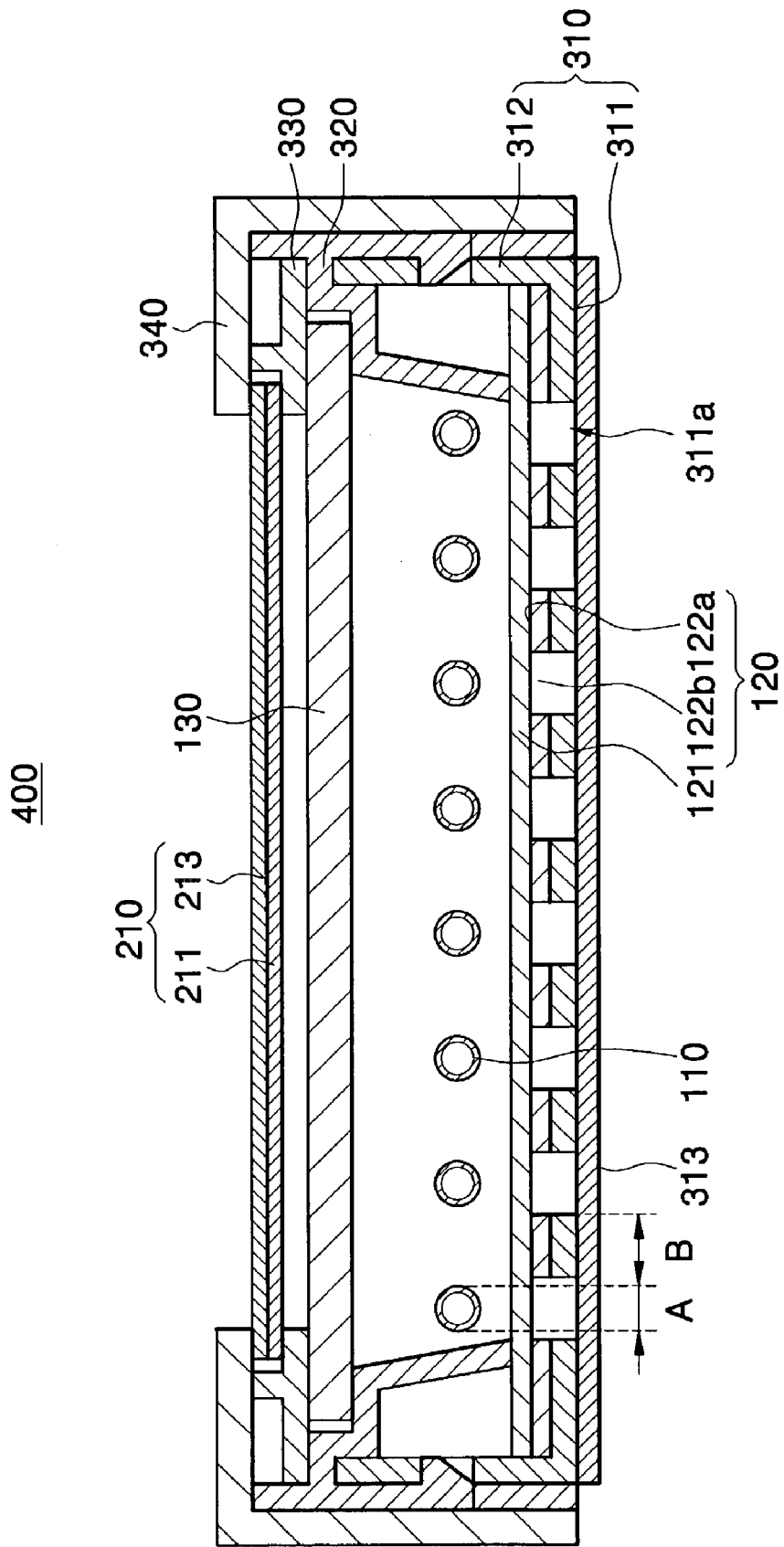
FIG. 13 is a cross sectional view showing the liquid crystal display device of FIG. 12.

FIG. 12 is an exploded perspective view showing a liquid crystal display device according to a fourth exemplary embodiment of the present invention, and FIG. 13 is cross sectional view showing the liquid crystal display device of FIG. 12.

Referring to FIG. 12 and FIG. 13, the LCD device 400 according to a fourth exemplary embodiment of the present invention includes a display unit 200 for displaying images, a backlight assembly 100 for providing light to the display unit 200, and containers 310, 320, 330, and 340 for receiving the display unit 200 and the backlight assembly 100.

The display unit 200 includes an LCD panel 210 for displaying images by using the liquid crystal, a plurality of printed circuit boards (PCBs) for driving the LCD panel 210, and a plurality of tape carrier packages (TCPs) for connecting the LCD panel 210 and the PCBs.

In detail, the LCD panel 210 includes a thin film transistor (TFT) substrate 211, a color filter substrate 213, and a liquid crystal layer (not shown) formed between the TFT substrate 211 and the color filter substrate 213. The TFT substrate 211 includes many pixels formed in a matrix shape including TFTs, gate lines and data lines connected to the TFTs, and pixel electrodes connected to the TFTs. The color filter substrate 213 includes color filers and a common electrode facing the TFT substrate 211.

The LCD panel 210 is connected with the PCBs (220, 230) for driving the TFT substrate 211 and the color filter substrate 213. The PCBs includes a data PCB 220 for generating image signals supplied to the data lines and a gate PCB 230 for generating driving signals supplied to the gate lines.

The data PCB 220 is connected with a data TCP 240 adhered to a data peripheral portion of the TFT substrate 211 on which one ends of the data lines are arranged, and the gate PCB 230 is connected with a gate TCP 250 adhered to a gate peripheral portion of the TFT substrate 211 on which one ends of the gate lines are arranged.

The backlight assembly 100 includes at least one lamp 110 for generating light, a lamp reflector 120 for reflecting the light to the LCD panel 210, and a diffusing sheet 130 for diffusing the light before the light reaches the LCD panel 210.

The lamp 110 includes a light emitting portion 111, a first electrode 112 that is formed at a first end of the light emitting portion 111 and receives a first voltage, a second electrode 113 that is formed at a second end of the light emitting portion 111 opposite to the first end and receives a second voltage lower than the first voltage.

The lamp reflector 120 includes a reflecting layer 121 that reflects a part of the light traveling in a first direction and allows the light to travel in a second direction opposite to the first direction, and a supporting member 122 for supporting the reflecting layer 121. The supporting member 122 includes a supporting sheet 122a for supporting the reflecting layer 121 and a plurality of penetrating holes 122b for reducing an overlapping area between the supporting sheet 122a and the lamps 110. The supporting sheet 122a is divided into a first region 'A' in which a plurality of lamps are arranged and a second region 'B' between the lamps 110. The plurality of penetrating holes 122b are formed in the first region A.

The plurality of penetrating holes 122b are formed in the supporting sheet 122a and arranged in the longitudinal direction of the lamps 110 with a uniform density such that an overlapping area between the supporting sheet 122a and each of the lamps 110 is reduced. As a result, the parasitic capacitance 'C' is reduced and the leakage current leaked from the lamps 110 decreases.

The plurality of penetrating holes 122b can also be formed in such a manner that a decrease in the overlapping area between the lamps 110 and the supporting sheet 122a gradually varies in inverse proportion to a distance between a penetrating hole and the first electrode 112. In other words, the plurality of penetrating holes 122b may be formed in such a manner that there are more penetrating holes around the second electrode 113 than around the first electrode 112.

The receiving container includes a bottom chassis 310, a low mold frame 320, an upper mold frame 330 and a top chassis 340. The bottom chassis 310 sequentially receives the backlight assembly 100 and the display unit 200. The upper mold frame 330 is disposed on an upper stepped portion of the low mold frame 320, receives the display unit 200 and fixes the backlight assembly 100 to the bottom chassis 310. The top chassis 340 is coupled with the bottom chassis 310 to be opposite to the bottom chassis 310 and presses the display unit 200 toward the upper mold frame 330.

The bottom chassis 310 includes a bottom surface 311 and sidewalls 312 vertically extended from the bottom surface 311 so that a receiving space for receiving the backlight assembly 100 is formed therein. A plurality of openings 311a are formed at the bottom surface 311 corresponding to the plurality of penetrating holes 122b formed on the supporting member 120. In case that the bottom chassis 310 is made of metal-based material, the parasitic capacitance 'C' is generated between the bottom chassis 310 and the lamp 110. In this case, the plurality of openings 311a formed at the bottom surface 311 reduce the overlapping area between the lamps 110 and the bottom surface 311 so that the parasitic capacitance 'C' between the lamps 110 and the bottom chassis 310 is reduced.

For example, the plurality of openings 311a are formed in such a manner that a decrease in the overlapping area between the bottom surface 311 and the lamps 100 gradually varies in inverse proportion to a distance between an opening and the second electrode 113 like the structure of the plurality of penetrating holes 122b.

The above described structure of the plurality of openings 311a and the plurality of penetrating holes 122a provides a space for receiving additional parts of the LCD device between the bottom chassis 310 and the lamp reflector 120. Namely, since the areal size of the plurality of openings 311a and the plurality of penetrating holes 122a is decreased around the second electrode 113, the space between the bottom chassis 310 and the lamp reflector 120 is increased, so that additional parts such as circuit boards for driving the lamps 110 and the LCD panel 210 can be received in the enlarged space.

When the lamp reflector 120 is received on the bottom surface 311, the lamps 110 are disposed above the reflective layer 121, and the diffusing sheet 130 is mounted above the lamps 110. The upper mold frame 330 is disposed on the diffusing sheet 130, and the LCD panel 210 is received on a stepped portion of the upper mold frame 330. Then, the top chassis 340 is coupled with the bottom chassis 310.

In the embodiment of FIG. 13, a foreign-matter protecting layer 313 for preventing entrance of a foreign matter into the LCD device is further formed under the bottom surface 311. Thus, no foreign matter may be entered into the LCD device through the plurality of openings 311a. The foreign-matter protecting layer 313 may be made of, for example, insulating material so as to prevent the parasitic capacitance 'C' between the lamps 110 and the foreign-matter protecting layer 313 from being generated.

Accordingly, the leakage current leaked from the lamps 110 is decreased, the light efficiency of the backlight assembly 100 is improved, the heat radiated from the lamps 110 is also reduced, and the display quality of the LCD device 400 is enhanced.

Figure 14:
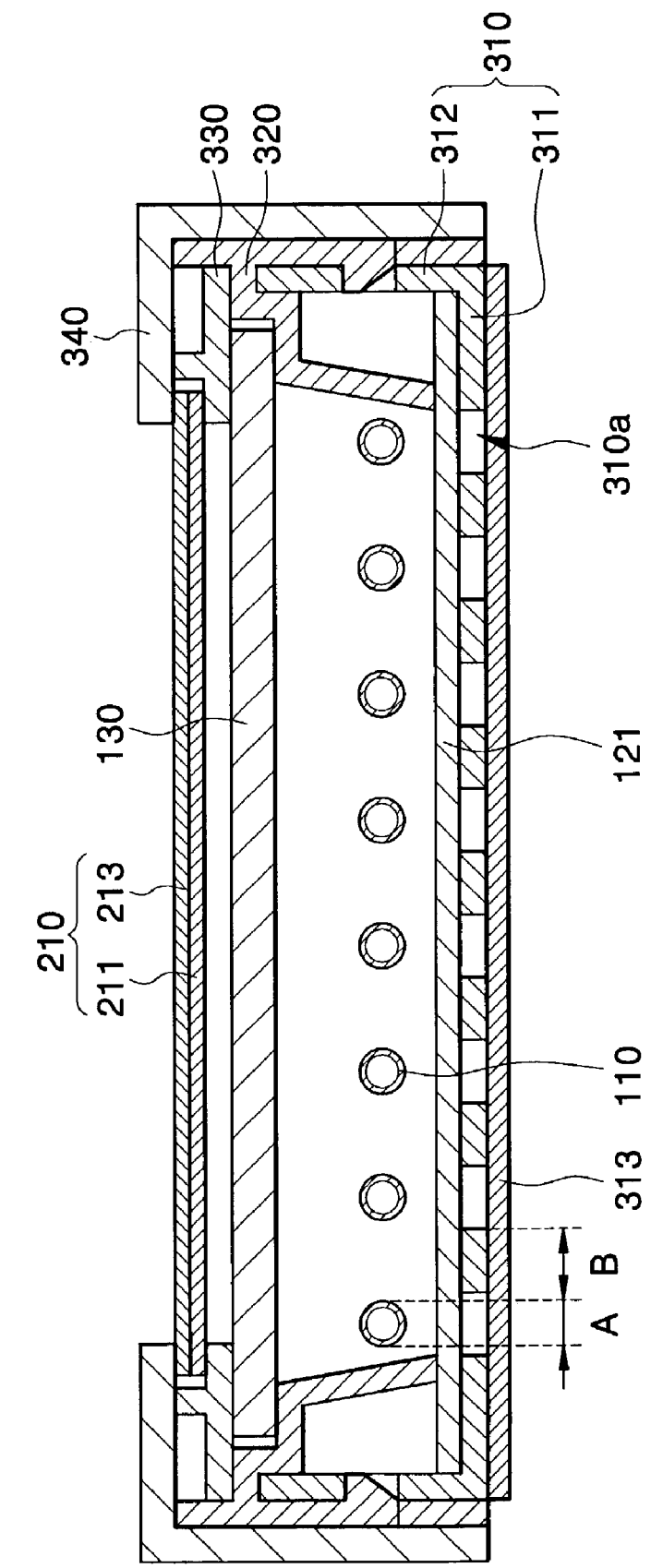
FIG. 14 is a cross sectional view showing an LCD device according to a fifth exemplary embodiment of the present invention.

FIG. 14 is a cross sectional view showing an LCD device according to a fifth exemplary embodiment of the present invention.

Referring to FIG. 14, the LCD device 400 according to a fifth exemplary embodiment of the present invention includes a display unit 200 for displaying images, a backlight assembly 100 for providing light to the display unit 200, and a plurality of containers 310, 320, 330, and 340 for receiving the display unit 200 and the backlight assembly 100.

The backlight assembly 100 includes at least one lamp 110 for generating light, a lamp reflector for reflecting the light to an LCD panel 210 of the display unit 200, and a diffusing sheet 130 for diffusing the light before the light reaches an LCD panel 210. The lamp reflector includes a reflecting layer 121 that reflects a part of the light traveling in a first direction and allows the light to travel in a second direction opposite to the first direction.

The receiving container includes a bottom chassis 310, a low mold frame 320, an upper mold frame 330 and a top chassis 340. The bottom chassis 310 sequentially receives the backlight assembly 100 and the LCD panel 210. The upper mold frame 330 is disposed on an upper stepped portion of the low mold frame 320, receives the LCD panel and fixes the backlight assembly 100 to the bottom chassis 310. The top chassis 340 is oppositely coupled with the bottom chassis 310 and presses the LCD panel 210 toward the upper mold frame 330.

The bottom chassis 310 includes a bottom surface 311 and sidewalls 312 vertically extended from the bottom surface 311 so that a receiving space for receiving the backlight assembly 100 is formed therein. A plurality of openings 310a are formed at the bottom surface 311. Specifically, the bottom surface 311 is divided into a first region 'A' in which the lamps 110 are arranged and a second region 'B' disposed between the lamps 110. The plurality of openings 310a are formed in the first region 'A'. The plurality of openings 310a reduce the overlapping area between the bottom chassis 310 and the lamps 110 so that the parasitic capacitance 'C' existing between the bottom chassis 310 and the lamps 110 is reduced.

In this embodiment, a foreign-matter protecting layer 313 is formed under the bottom surface 311 of the bottom chassis 310 to prevent entrance of a foreign matter into the LCD device 400 through the openings 310a, and to easily coat the reflecting layer. For example, the foreign-matter protecting layer 313 may be made of an insulating tape for preventing the parasitic capacitance 'C' between the foreign-matter protecting layer 313 and the lamp 110 from being generated.

According to the lamp assembly and LCD device of the exemplary embodiments of the present invention, a supporting member is disposed under at least one lamp generating light. The supporting member includes a supporting sheet for supporting a reflecting layer and a plurality of penetrating holes formed at the supporting sheet along the longitudinal direction of the lamp so as to reduce the overlapping area between the supporting sheet and the lamps.

Accordingly, the leakage current leaked from the lamps is decreased, the light efficiency of the backlight assembly is improved, the heat radiated from the lamp is reduced, and the display quality of the LCD device is enhanced.

Although the exemplary embodiments of the present invention have been described, it is understood that the present invention should not be limited to these embodiments but various changes and modifications can be made by one skilled in the art within the spirit and scope of the present invention as hereinafter claimed.

What is claimed is:

1. A lamp assembly comprising:
   at least one lamp for generating light;
   a reflecting layer for reflecting light from the lamp; and
   a conductive supporting member including a supporting sheet for supporting the reflecting layer and a plurality of penetrating holes formed in the supporting sheet,
   wherein an area of the penetrating holes in a first area adjacent to a first end of the lamp is larger than an area of the penetrating holes in a second area adjacent to a second end of the lamp opposite to the first end.

2. The lamp assembly of claim 1, wherein the penetrating holes are formed at area corresponding to the lamp and arranged in a longitudinal direction of the lamp.

3. The lamp assembly of claim 1, wherein the penetrating holes each have a circular or polygonal shape.

4. The lamp assembly of claim 1, wherein a width of each of the penetrating holes is equal to or greater than a width of the lamp.

5. The lamp assembly of claim 1, wherein the lamp includes a first electrode and a second electrode, the first electrode receives a first voltage and is disposed at the first end of the lamp, the second electrode receives a second voltage lower than the first voltage and is disposed at the second end of the lamp, and a decrease in an overlapping area of the supporting sheet above which the lamp is placed varies in proportion to a distance between a penetrating hole and the second electrode.

6. The lamp assembly of claim 5, wherein a density of the penetrating holes at an area of the supporting sheet increases in proportion to a distance between the area and the second electrode.

7. The lamp assembly of claim 5, wherein a size of the penetrating holes at an area of the supporting sheet increases in proportion to a distance between the area and the second electrode.

8. The lamp assembly of claim 1, wherein the reflecting layer is comprised of poly ethylene terephthalate (PET), and the conductive support comprised of metal.

9. A lamp assembly comprising:
   at least one lamp for generating light;
   a reflecting layer for reflecting light from the lamp; and
   a conductive supporting member including a supporting sheet for supporting the reflecting layer and a plurality of grooves formed in the supporting sheet.

10. The lamp assembly of claim 9, wherein the grooves are formed at an area corresponding to the lamp and each have a predetermined depth, the grooves being arranged in a longitudinal direction of the lamp.

11. A liquid crystal display device comprising:
    a backlight assembly including:
      at least one lamp to generate light;
      a reflecting layer to reflect light from the lamp; and
      a conductive supporting member having a supporting sheet to support the reflecting layer arid a plurality of penetrating holes formed in the supporting sheet;
    a liquid crystal display panel to display images by using liquid crystal onto which the light is incident;
    a first container to receive the backlight assembly and the liquid crystal display panel; and
    a second container coupled with the first container, to fix the backlight assembly and the liquid crystal display panel into the first container
    wherein an area of the penetrating hole in a first area adjacent to a first end of the lamp is larger than an area of the penetrating holes in a second area adjacent to a second end of the lamp opposite to the first end.

12. The liquid crystal display device of claim 11, wherein the lamp includes a first electrode and a second electrode, the first electrode receives a first voltage and is disposed at the first end of the lamp, the second electrode receives a second voltage lower than the first voltage and is disposed at the second end of the lamp, and a decrease in an overlapping area of the supporting sheet above which the lamp is placed varies in proportion to a distance between a penetrating hole and to second electrode.

13. The liquid crystal display device of claim 12, wherein a density of the plurality of penetrating holes at an area of the supporting sheet increases in proportion to a distance between the area and the second electrode.

14. The liquid crystal display device of claim 11, wherein a plurality of openings corresponding to the plurality of penetrating holes are formed in a bottom surface of the first container.

15. The liquid crystal display device of claim 14, wherein the first container further includes a foreign-matter protecting layer to prevent entrance of a foreign matter into the first container through the plurality of penetrating holes and the plurality of openings.

16. The liquid crystal display device of claim 15, wherein the foreign-matter protecting layer is disposed under the bottom surface of the first container.

17. A liquid crystal display device comprising:
    a backlight assembly including:
      a plurality of lamps to generate light;
      a reflecting layer to reflect light from the lamps, the reflecting layer being disposed under the lamps; and
      a diffusing sheet to diffuse the light from the lamps, the diffusing sheet being disposed on the lamps;

a liquid crystal display panel to display images by using liquid crystal onto which the light is incident; and a conductive receiving container to receive the backlight assembly and the liquid crystal display panel, the conductive receiving container including a bottom surface to support the reflecting layer and a plurality of penetrating holes formed in the bottom surface, wherein an area of the penetrating in a first area adjacent to a second end of the is lager than an area of the penetrating holes in a second area adjacent to a second end of the lamp opposite to the first end.

18. The liquid crystal display device of claim 17, wherein the conductive receiving container further includes a foreign-matter protecting layer to prevent entrance of a foreign matter into the conductive receiving container through the plurality of holes.

19. The liquid crystal display device of claim 17, wherein a density of the plurality of holes is higher at a first area than at a second area of the bottom surface, the first and second areas being close to first and second electrodes, respectively, of the lamp in which a voltage applied to the first electrode is higher than a voltage applied to the second electrode.

20. A backlight assembly comprising:
a plurality of lamps to generate light;
a reflecting layer to reflect light from the lamps, the reflecting layer being disposed under the lamps;
a conductive supporting member including a supporting sheet to support the reflecting layer and a plurality of penetrating holes formed in the supporting sheet; and
a diffusing sheet to diffuse the light from the lamps, the diffusing sheet being disposed on the lamps,
wherein an area of the penetrating holes in a first area adjacent to a first end of the lamp is larger than an area of the penetrating holes in a second area adjacent to a second end of the lamp opposite to the first end.

21. The backlight assembly of claim 20, wherein the penetrating holes are formed in the first area of the supporting sheet with a uniform density and the penetrating holes are formed in the second area of the supporting sheet with a uniform density to reduce an overlapping area of the supporting sheet above which the lamp is placed.

22. The backlight assembly of claim 20, wherein each of the lamps includes a first electrode and a second electrode, respectively, the first electrode receives a first voltage and is disposed at the first end of the lamps, the second electrode receives a second voltage lower than the first voltage and is disposed at the second end of the lamps, and a decrease in an overlapping area of the supporting sheet above which the lamps is being placed varies in proportion to a distance between a penetrating hole and the second electrode.

23. A liquid crystal display device comprising:
a backlight assembly including:
a plurality of lamps to generate light;
a reflecting layer to reflect light from the lamps, the reflecting layer being disposed under the lamps;
a conductive supporting member including a supporting sheet to support the reflecting layer and a plurality of penetrating holes formed in the supporting sheet; and
a diffusing sheet to diffuse the light from the lamps, the diffusing sheet being disposed on the lamps;
a liquid crystal display panel to display images by using liquid crystal onto which the light is incident;
a first receiving container to receive the backlight assembly and the liquid crystal display panel; and
a second receiving container coupled with the first container to fix the backlight assembly and the liquid crystal display panel into the first container,
wherein an area of the penetrating holes in a first area adjacent to a first end of the lamp is larger than an area of the penetrating holes in a second area adjacent to a second end of the lamp opposite to the first end.

24. The liquid crystal display device of claim 23, wherein the penetrating holes are formed in the first area of the supporting sheet with a uniform density and the penetrating holes are formed in the second area of the supporting sheet with a uniform density to reduce an overlapping area of the supporting sheet above which the lamps are placed.

25. The liquid crystal display device of claim 23, wherein each of the lamps includes a first electrode and a second electrode respectively, the first electrode receives a first voltage and is disposed at a first end of the lamps, the second electrode receives a second voltage lower than the first voltage and is disposed at a second end of the lamps, and a decrease in an overlapping area of the supporting sheet above which the lamps are placed varies in proportion to a distance between a penetrating bole and the second electrode.

* * * * *